US011436800B2

(12) United States Patent
Perry et al.

(10) Patent No.: US 11,436,800 B2
(45) Date of Patent: Sep. 6, 2022

(54) INTERACTIVE SYSTEM AND METHOD PROVIDING REAL-TIME VIRTUAL REALITY VISUALIZATION OF SIMULATION DATA

(71) Applicant: IMMERSIVE VISUALIZATION, INC., Provo, UT (US)

(72) Inventors: Robert Perry, Maplewood, NJ (US); Ernest Perry, Provo, UT (US)

(73) Assignee: IMMERSIVE VISUALIZATION, INC., Provo, UT (US)

( * ) Notice: Subject to any disclaimer, the term of this patent is extended or adjusted under 35 U.S.C. 154(b) by 0 days.

(21) Appl. No.: 17/290,958

(22) PCT Filed: Nov. 7, 2019

(86) PCT No.: PCT/US2019/060284
§ 371 (c)(1),
(2) Date: May 3, 2021

(87) PCT Pub. No.: WO2020/097343
PCT Pub. Date: May 14, 2020

(65) Prior Publication Data
US 2021/0327138 A1 Oct. 21, 2021

Related U.S. Application Data

(60) Provisional application No. 62/757,627, filed on Nov. 8, 2018.

(51) Int. Cl.
*G06T 15/04* (2011.01)
*G06T 17/20* (2006.01)

(52) U.S. Cl.
CPC .............. *G06T 17/20* (2013.01); *G06T 15/04* (2013.01)

(58) Field of Classification Search
CPC ......... G06T 17/20; G06T 15/04; G06T 17/30; G06F 30/23
See application file for complete search history.

(56) References Cited

U.S. PATENT DOCUMENTS 8,064,684 B2   11/2011   Ratti et al.
8,743,115 B1   6/2014    Mallet et al.
(Continued)

OTHER PUBLICATIONS

International Search Report and Written Opinion, dated Jan. 16, 2020, for PCT/US2019/060284 filed Nov. 7, 2019.
(Continued)

*Primary Examiner* — Said Broome
(74) *Attorney, Agent, or Firm* — Workman Nydegger

(57) ABSTRACT

A method for providing an immersive VR experience comprises defining in the computer memory, a model representing a three-dimensional model. The method further comprises producing field data based upon a simulation of the three-dimensional model. Additionally, the method comprises storing the field data within a data structure. The method also comprises extracting, for display, a surface of the three-dimensional model from a simulation model. The method additionally comprises creating a surface texture for the surface of the three-dimensional model from the field data. Further, the method comprises creating a query optimized grid from the calculated field data. Further still, the method comprises displaying a visualization of the calculated field data by means of the surface and the query optimized grid.

14 Claims, 14 Drawing Sheets

(56) References Cited

U.S. PATENT DOCUMENTS

| | | | |
|---|---|---|---|
| 8,786,609 | B2 | 7/2014 | Wang et al. |
| 8,947,455 | B2 | 2/2015 | Friesen |
| 9,367,950 | B1 | 6/2016 | Scranton et al. |
| 9,582,933 | B1 | 2/2017 | Mosterman et al. |
| 9,594,856 | B2 | 3/2017 | McDaniel |
| 9,922,463 | B2 | 3/2018 | Lanier et al. |
| 10,002,432 | B2 | 6/2018 | Jung et al. |
| 10,043,311 | B2 | 8/2018 | Gabrys et al. |
| 10,102,316 | B2 | 10/2018 | Van der Velden |
| 2012/0113142 | A1* | 5/2012 | Adhikari ............ G06Q 30/0623 345/633 |
| 2012/0206452 | A1* | 8/2012 | Geisner ................. H04S 7/304 345/419 |
| 2014/0052427 | A1 | 2/2014 | Yahiaoui et al. |
| 2014/0253547 | A1 | 9/2014 | Schmidt |
| 2015/0269785 | A1 | 9/2015 | Bell et al. |
| 2016/0179992 | A1 | 6/2016 | Van der Velden |
| 2017/0046833 | A1 | 2/2017 | Lurie et al. |
| 2017/0076495 | A1 | 3/2017 | Gabrys et al. |
| 2017/0293705 | A1 | 10/2017 | Van Der Velden et al. |
| 2018/0082473 | A1 | 3/2018 | Stoddart et al. |

OTHER PUBLICATIONS

Mahjour-Bonab, Mahdi et al., Query Optimization in Grid Databases Using with Particle Swarm Optimization, Nov. 30, 2012, International Journal of Computer Science Issues, pp. 284-291, vol. 9, Issue 6, No. 2.

International Preliminary Report on Patentability received for PCT Patent Application No. PCT/US19/60284, dated May 20, 2021, 6 pages.

Bao, J.S., et al., "Immersive virtual product development," Journal of Materials Processing Technology, vol. 129, Issues 1-3, Oct. 11, 2002, pp. 592-596.

Ben-Joseph, E., et al., "Urban simulation and the luminous planning table: Bridging the gap between the digital and the tangible," Journal of Planning Education and Research, vol. 21, Issue 2, 2001, pp. 196-203.

Billinghurst, M., et al., "Collaborative Mixed Reality," IN 'Mixed Reality—Merging Physical world and Virtual World', Proceedings of the International Symposium on Mixed Reality (ISMR '99), Mar. 19-21, 1999, Yokohama, Japan, pp. 261-284.

Fiorentino, M., et al., "Spacedesign: a mixed reality workspace for aesthetic industrial design," Proceedings. International Symposium on Mixed and Augmented Reality, 2002, pp. 1-9.

Florentino, M., et al., "Interactive "touch and see" FEM Simulation using Augmented Reality," International Journal of Engineering education, 2009, 16 pages.

Grasset, R., et al., "Interactive Mediated Reality," 6th Australasian User Interface Conference, vol. 40, 2005, pp. 21-29.

Jesus de Santos Garcia, "Fast File Loading (Pt.2)", Jun. 11, 2007 https://www.gamasutra.com/view/feature/1461/fast_file_loading_pt_2.php?, pp. 6.

Kim, D., et al., "Interactive Fluid Simulation Method for Mobile Device," The HCI Society of Korea, 2009, pp. 463-468. (English Abstract).

Kim, M., et al., "Augmented-reality visualization of aerodynamics simulation in sustainable cloud computing," Sustainability, vol. 10, Issue 5, 2018,1362, pp. 1-14.

Krassentein, B., "New Details on VRClay, The Virtual Reality CAD Software Which Could Transform the 3D Modelling Space,"3D Printing Virtual Reality, Oct. 3, 2014 , pp. 5.

Kuhner, S., et al., "Efficient reduction of 3D simulation results based on spacetree data structures for data analysis in Virtual Reality environments," AVR II and CONVR2001 Conference at Chalmers, Gothenburg, Sweden, Oct. 4-5, 2001, pp. 1-8.

Labelle, F., et al., "Isosurface Stuffing: Fast Tetrahedral Meshes with Good Dihedral Angles," ACM Transactions on Graphics, vol. 26, Issue 3, 57, Jul. 2007, pp. 57-1-57-10.

Lifton, J., et al., "Dual Reality: Merging the Real and Virtual," International Conference on Facets of Virtual Environments, 2009, pp. 12-28.

Lorensen W.E. et al., "Marching Cubes : A High Resolution 3D Surface Construction Algorithm," 3D medical information flow, 1987, pp. 13.

Newmam. T. S. et al., "A survey of the marching cubes algorithm," Computers & Graphics, vol. 30, 2006, pp. 854-879.

Rosenblum L. et al., "Analyses Using VR/AR Visualization," Projects in VR, 2008, pp. 84-87.

Rosenman, M., et al., "Designworld: A Multidisciplinary Collaborative Design Environment Using Agents in a Virtual World," Design Computing and Cognition, 2006, pp. 18.

Seo, J., et al., "Design for Presence: A Structured Approach to Virtual Reality System Design," Presence, vol. 11, Issue 4, 2002, pp. 378-403.

Speray, D., et al., "Volume probes: interactive data exploration on arbitrary grids," Computer graphics, vol. 24, Issue 5, 1990, pp. 5-12.

* cited by examiner $$k_1 = f(x_i, y_i)$$
$$k_2 = f(x_i + 0.5h, y_i + 0.5k_1 h)$$
$$k_3 = f(x_i + 0.5h, y_i + 0.5k_2 h)$$
$$k_4 = f(x_i + h, y_i + k_3 h)$$
$$y_{i+1} = y_i + \frac{1}{6}h(k_1 + 2k_2 + 2k_3 + k_4)$$

Where the step size is:

$$h = x_{i+1} - x_i$$

INTERACTIVE SYSTEM AND METHOD PROVIDING REAL-TIME VIRTUAL REALITY VISUALIZATION OF SIMULATION DATA

CROSS-REFERENCE TO RELATED APPLICATIONS

This application claims priority to PCT Application No. PCT/US2019/060284 filed Nov. 7, 2019, which claims the benefit of and priority to U.S. Provisional Application Ser. No. 62/757,627 entitled "INTERACTIVE SYSTEM AND METHOD PROVIDING NEAR REAL TIME VIRTUAL REALITY VISUALIZATION OF SIMULATION DATA", filed on Nov. 8, 2018. All the aforementioned applications are incorporated by reference herein in their entirety.

BACKGROUND OF THE INVENTION

1. Technical Field

The invention generally relates to the field of computer programs and systems and more specifically to the fields of product design and simulation and augmented and virtual reality. The embodiments of the invention may be applied in non-limiting examples such as virtual reality, augmented reality, product design and simulation, collaborative decision making and product lifecycle operation and education and entertainment, e.g., video games and movies.

2. Background and Relevant Art

Applications providing virtual reality (VR) experiences are generally known. Through the VR experience provided by this application, a user is enabled to interact with a simulation model and visualize its results. A user typically experiences the VR experience through a headset mounted device (HMD), such as a helmet mounted display, a pair of wearable glasses, and/or any other types of HMD. Through the HMD, the user may traverse the virtual space (e.g., look-around, walk-around, fly-through). The VR system may provide controllers for the user to manipulate, inspect, measure virtual objects in the VR environment, perform an operation, exercise controls, and/or engage in other types of interactions within the virtual space. The user interactions are typically executed in real-time to enhance the virtual experience. Sound, haptic devices, and other non-visual technologies may also be used to enhance the virtual experience.

A number of existing product design and simulation systems are offered on the market for the design and simulation of systems, parts, or assemblies of parts. Such product and simulation systems typically employ computer aided design (CAD) and/or computer aided engineering (CAE) programs to specify the digital geometric representation and functional characteristics of the product. These systems allow a user to construct, manipulate, and simulate complex three-dimensional models of objects or assemblies of objects. These CAD and CAE systems thus, provide a representation of modeled objects using points, lines, polygons, and surfaces. Lines and surfaces may be represented in various manners, e.g. non-uniform rational basis-splines (NURBS).

The advent of CAD and CAE systems permit a wide range of simulation models of objects. These simulations predict the behavior of the product in various conditions. An example would be the structural response of a building to various forces such as wind and earthquakes. Another common simulation is computational fluid dynamics (CFD) which simulates fluid flow around or through a product such as water through a piping system or an airplane flying through the air. A simulation or CAE model is typically a separate model from the CAD model. A common representation of a simulation model consists of a system of points which are connected to form simple geometric shapes called elements such as a triangle or quadrilateral in two dimensions or a hexahedron or tetrahedron in three dimensions. These elements are combined to form a mesh which constitutes the geometric aspect of the simulation model. These models may be derived from a CAD model and may represent one or more parts or an entire assembly. Simulation models may be programmed in such a way that the model has the properties of the underlying object that it represents. The model is then able to predict behavior of the underlying object in the physical environment. Moreover, CAD and CAE models can be utilized to simulate engineering systems.

BRIEF SUMMARY OF THE INVENTION

The present invention can comprise systems, methods, and apparatus configured to dynamically present visualization of CAD and CAE models through a VR application. In particular, implementations of the present invention can additionally or alternatively comprise a computer system containing a file import component, simulation model data component, a data translator component, a component to provide data computation and visualization, and a user interface component, and or any other components. The data translator probes the original CAE model and produces an optimized data structure for the visualization component. This invention enables users to query and interact with the CAD and CAE models in real-time in a virtual reality.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the reduction to practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
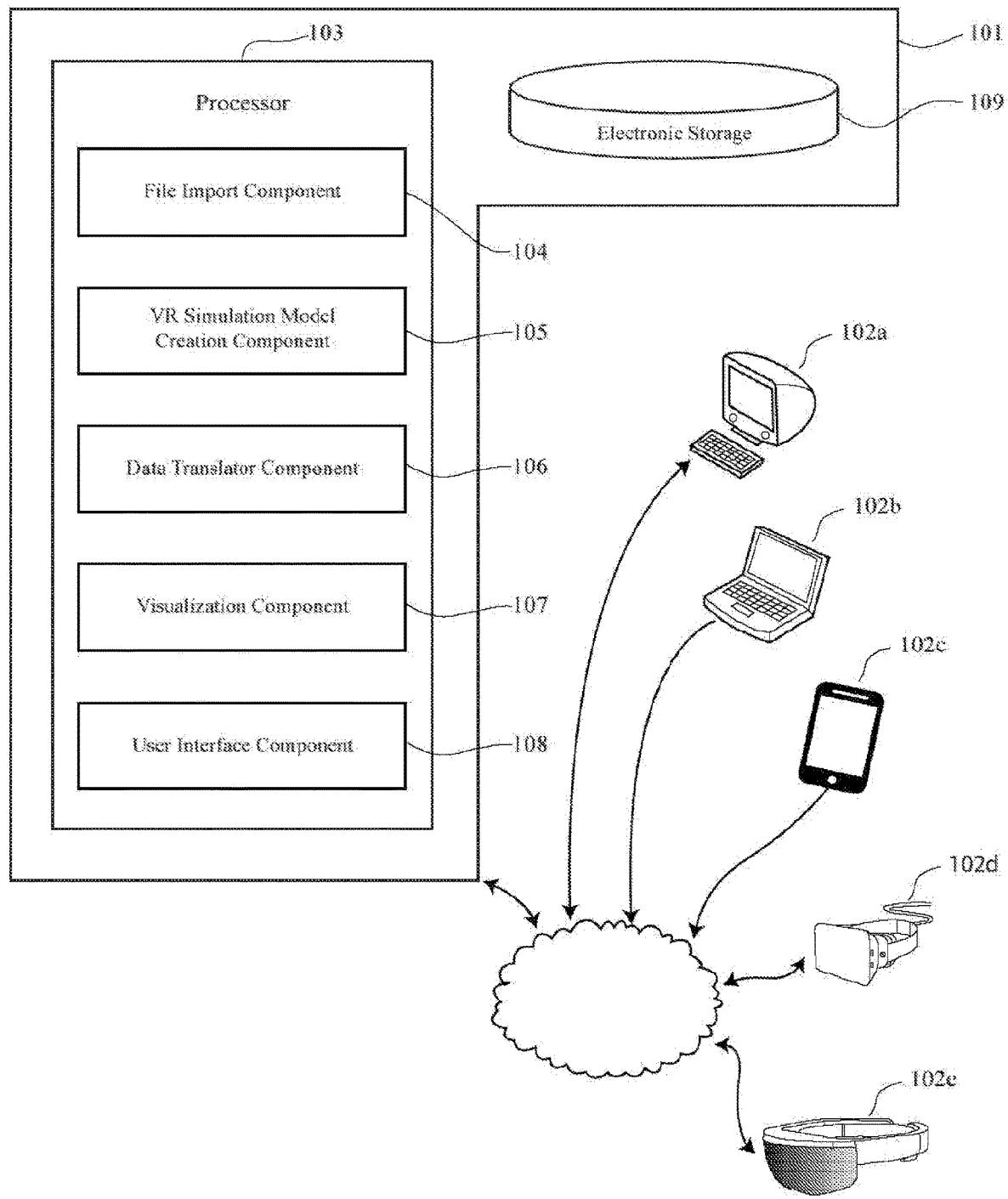
FIG. 1 illustrates one example of a system configured for providing real-time VR experiences for visualization of CAD and/or CAE simulation data in accordance with the disclosure.

The present invention extends to systems, methods, and apparatus configured to dynamically present visualization of complex data models, and CAD and CAE models through a VR application. In particular, implementations of the present invention can additionally or alternatively comprise a computer system containing a file import component, simulation model data component, a data translator component, a component to provide real-time data computation and visualization, and a user interface component, and or any other components. The data translator probes the original complex data and or CAE model and produces an optimized data structure for the visualization component. This invention enables users to query and interact with the complex data and or CAD and CAE models in real-time in a virtual reality.

A system may be constructed to provide a virtual or augmented reality interactive experience. A user of the system may be enabled with various methods to visualize complex models such as but not limited to CAE simulation data in various forms. This VR information may be determined based on the user's dynamic inputs to the system. This may facilitate an iterative process in which the user is enabled to quickly immerse himself or herself in a virtual space that simulates the performance of a complex simulation model, interact with the virtual space, modify the visualization inputs, and re-experience VR based on the modified displayed results.

The file import component may be configured to facilitate a user to import a variety of complex model files. Some non-limiting examples include at least one of: a computer aided engineering (CAE) model, a finite element model, a finite volume model, a computational fluid dynamics model (CFD), a high-fidelity scanned model and/or a computer aided design model.

The simulation model component may be configured to obtain model information from the files imported by the file import component. This may involve extraction of a subset of the model mesh for displaying the geometric model. This implementation may also simplify the resulting geometric model mesh to facilitate its display in virtual or augmented reality. This component may also extract the field data from the simulation model which are subsequently stored in computer memory. In some non-limiting examples, the field data may include at least one of: temperature, density, velocity, pressure, stress, strain, magnetic fields, electric fields, field direction, current flow, and vector potential, among others.

The data translator component is used to convert the field data in the simulation model to a format that is efficiently queried and displayed in virtual or augmented reality. The data translator component may be configured to create surface texture maps to display scalar field data. The data translator component may also be configured to create a secondary data structure for the field data. The secondary data structure is utilized by the visualization component to enable data query and operations such as numerical integration in real-time. Additionally, the data translator component may be configured to output data sets to binary files that are constructed in a manner that enables their being input later as needed using fast file loading methods.

The data computation and visualization component may be configured to process the simulation model field data to facilitate user interaction and "what if" evaluations and understanding of the simulation results. This may also include visualizing the differences between a baseline CAE model and a design variation CAE model enabling users to rapidly discern the ramifications of design changes. The field data may be displayed using a variety of visualization entities which may include streamlines, particle flows, isosurfaces, contours, slices, and glyphs. The data displayed may also include transient field data that is rendered in a time loop.

"Real-time" as used in this patent refers to the response of the VR system. VR systems typically render to the HMD at either 80 or 90 frames per second (FPS). With appropriately specified commercially available computer hardware systems, the data computation and visualization component can provide the ability to manipulate and simulate complex three-dimensional models of objects or assemblies of objects at the required MID framerate. It can also enable the user to create and/or display visualization entities at the required HMD framerate, thus providing real-time interaction.

The user interface component may be comprised of virtual tools that enable a user to dynamically produce visualization entities. Various interfaces may be facilitated by the interface component to enable multiple users to simultaneously interact with the simulation model and each other, translate or rotate the model and associated data visualizations, add commentary to the virtual space, capture and export images and/or videos of the VR, and/or perform any other user operations.

Accordingly, the present invention enables the real-time query and visualization of high-fidelity CAE simulation data in a VR environment. Traditionally the computational cost of computing visualization tools such as streamlines, particle flows, isosurfaces, slices, and glyphs has prohibited their creation and real-time user interaction with changing inputs, during a VR experience. They are typically created beforehand and then displayed in VR. The present invention provides systems and methods that provide the capability to dynamically create and render the visualization tools in VR systems that render at 80 to 90 frames per second. This facilitates a user, or group of users to quickly query the data in an immersive environment thereby promoting enhanced understanding of the design.

FIG. 1 illustrates one example of a system configured for providing real-time VR experiences for visualization of CAD and/or CAE simulation data in accordance with the disclosure. In some implementations, as shown in this example, the VR application 100 may include a server 101. As shown, the server 101, may be configured to communicate with a client device 102 via a network. The client devices 102 may be associated with users and implement a VR experience visualizing CAE simulation data. FIG. 1 illustrates some examples of client devices 102, which may include one or more of a desktop computer, a laptop computer, a tablet, a mobile phone, an HMD device, or augmented reality (AR) glasses.

Figure 2:
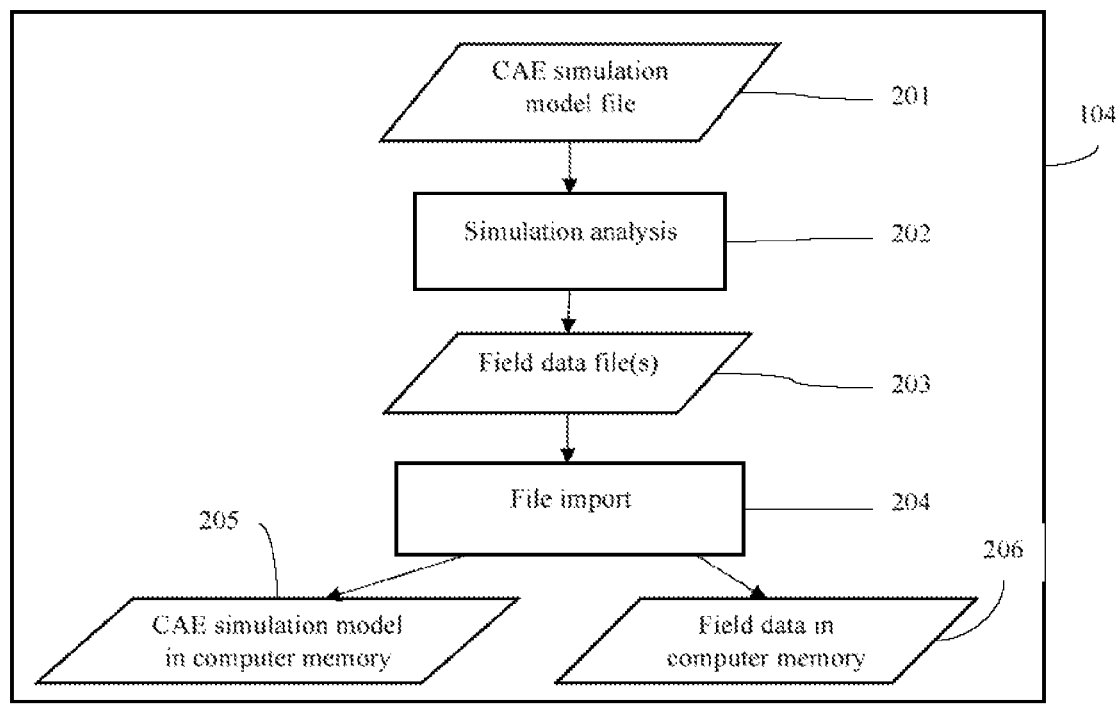
FIG. 2 is a flowchart of a method implementing the file import component that inputs the results from a CAD and/or CAE model in the VR system according to an embodiment of the present invention.

FIG. 2. is a flowchart of the file import component 104 from FIG. 1 that inputs the results from a simulation model in the VR system according to an embodiment of the present invention. A high-fidelity CAE simulation model 201, may take hours to complete even if the simulation analysis, 202 is performed in parallel on a computer cluster. The resulting field data 203 may reside in a single or multiple files. The file import system 204 reads the field data files 203, concatenates them if required, and stores them in computer memory. Additionally, the file import system 204 inputs the CAE simulation model 201 and stores it in computer memory.

Figure 3:
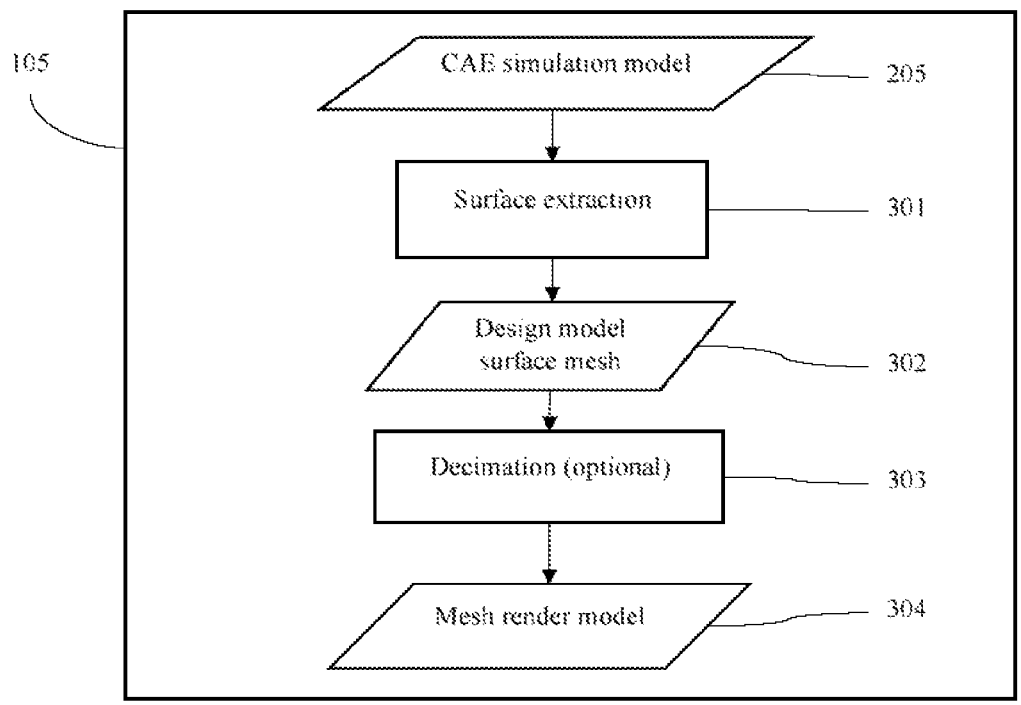
FIG. 3 is a flowchart that illustrates a method of constructing the VR render model of the simulated object implementing the simulation model component.

FIG. 3 is a flowchart of the VR simulation model creation component 105.

A CAE simulation model 205 frequently consists of domains other than just the geometry of the design model. For example, a CFD external flow simulation mesh models an extended space around the design model which models the fluid in the volume surrounding the design model. An internal CFD simulation mesh models a domain inside of the design model such as a space inside a pipe. These additional meshes used to model domains separate from the design model are not needed for the mesh render model 304. The surface extraction method 301 extracts the surface mesh 302, from the CAE simulation model 205 that corresponds to the design model to create a mesh render model 304 that is appropriate for display in the VR environment. For a high-fidelity CAE simulation model 205, the render model 304, may have a very large polygon count which is too high for real-time rendering. Decimation 303 is an optional method that may be used to reduce the polygon count of a mesh render model 304. Decimation 303 reduces the number of polygons in the mesh render model 304 while maintaining a good geometric approximation to the original data.

Figure 4:
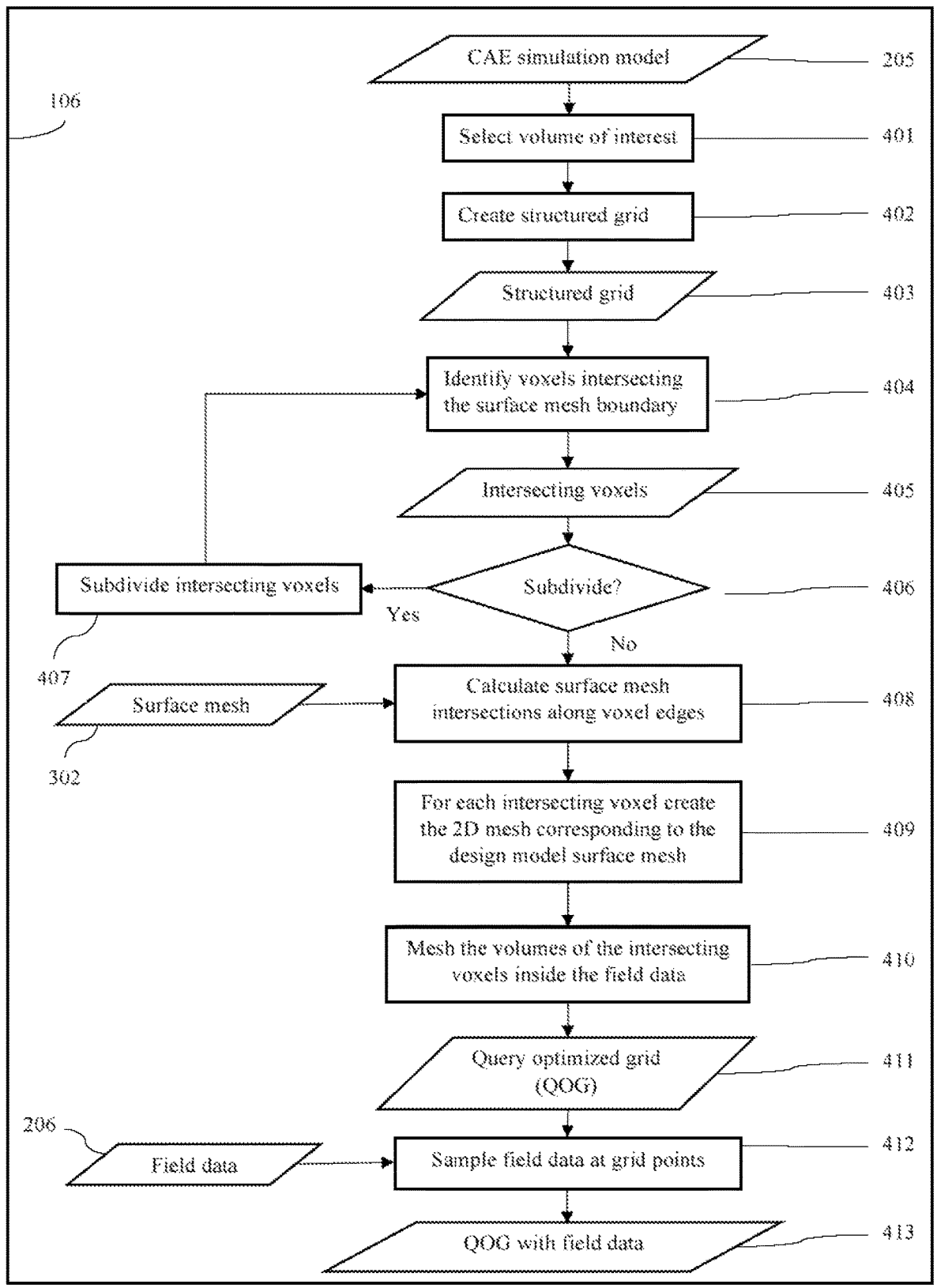
FIG. 4 is a flowchart that illustrates one method of the data translator component which constructs a query optimized grid data structure for the CAE simulation field data.

FIG. 4 is a flowchart of a system of the data translator component 106. High-fidelity CAE simulation models 205 of design models are usually created as an unstructured grid so that the elements of the mesh are arranged in an irregular pattern that enables the CAE simulation model 205 to model complex shapes. CAE simulation models 205 frequently consist of over 100 million elements 503. As a result, currently it is not possible to interact with the field data 206 of CAE simulation models 205 of this size and complexity in real-time. The data translator component 106 implements systems and methods to enable real-time field data 206 visualization. This is primarily accomplished by the construction of a query optimized grid (QOG) 413. A QOG 413 is an efficient data structure that stores scalar or vector field data 206 of a CAE model 205 at regular indices with possible refinement through spatial decomposition (for example using unstructured grid elements) such that the data can be efficiently extracted over a three-dimensional environment.

Figure 6:
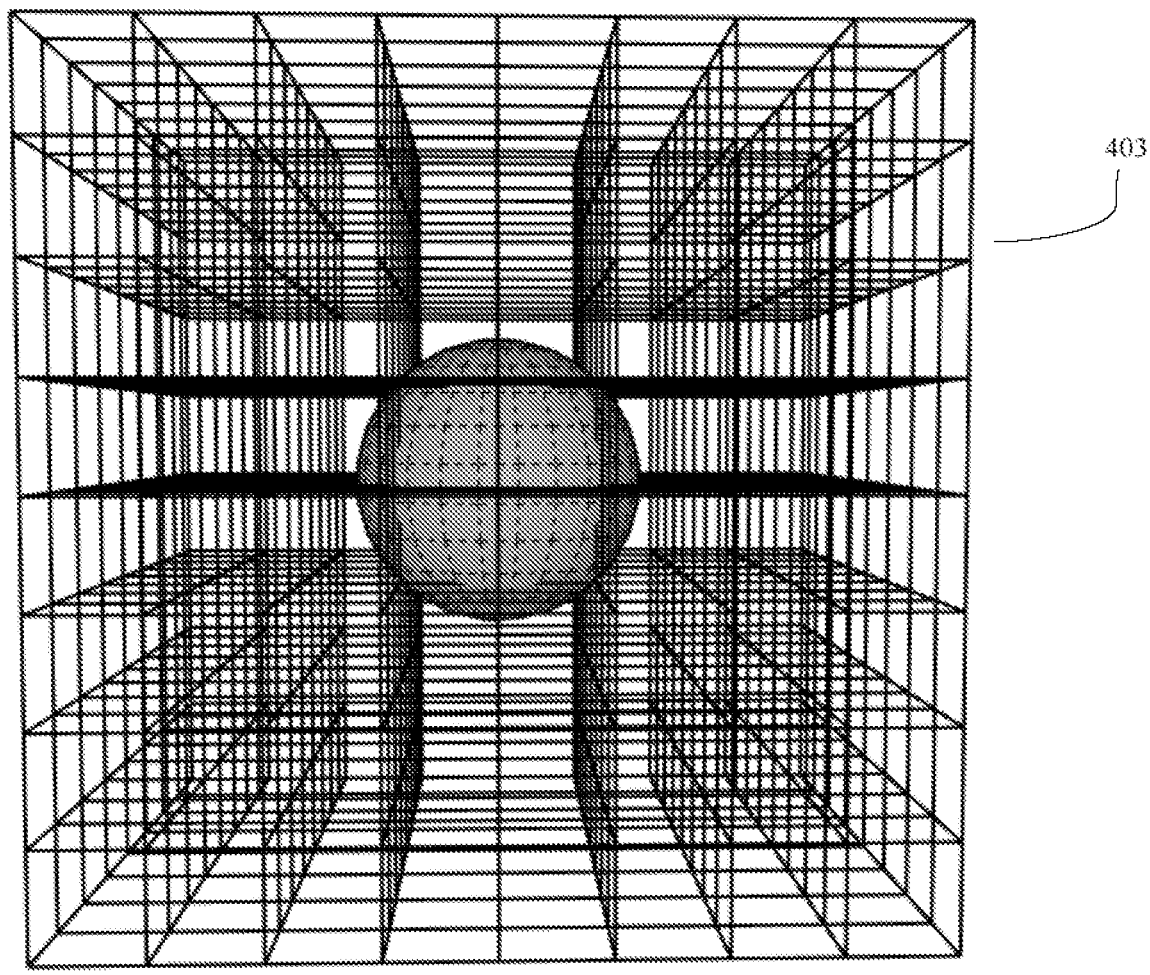
FIG. 6 depicts a polygonal geometric model embedded in a structured grid.

The field data 206 to be visualized may only comprise a small subset of the entire field data. In method 401, a sub volume is defined consisting of the volumetric region of interest for the visualization. In step 402, a structured grid 403 is created. An example structured grid 403 with a sphere embedded in the center is displayed in FIG. 6.

Figure 7:
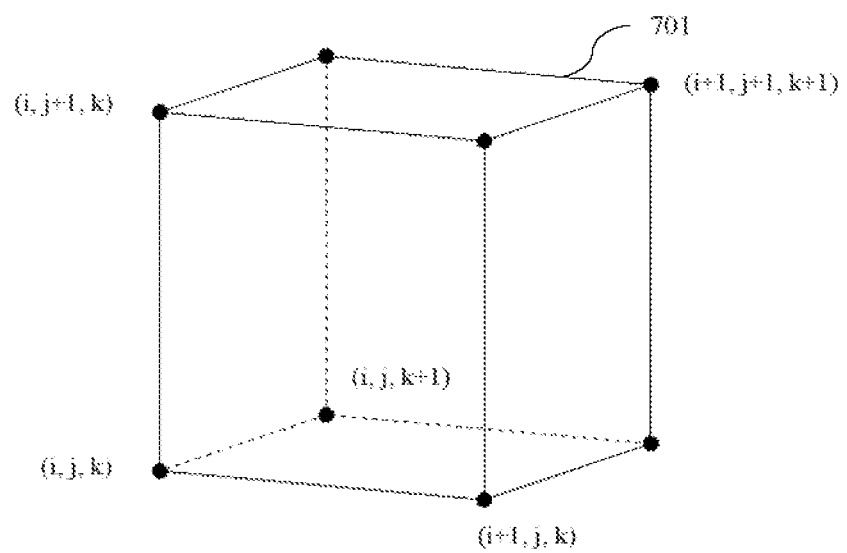
FIG. 7 is an image of a voxel from the structured grid displaying it's points i, j, k coordinates.

A structured grid 403 is organized in columns and rows of voxels (also commonly known as cells). Each point in the three-dimensional grid has a corresponding i, j, k index value which is unique. The physical locations of the points in the grid may be stored or may be functionally related to the mesh space (x, y, z)=f(i, j, k). It is also implied that incrementing any of the indices i,j, or k by 1 will define a point that is a neighbor of the point defined by i, j, k as displayed in FIG. 7. Each point of the structured grid 403 is classified based on whether it exists inside a region of the model associated with field data 206 or not. For example, in an external flow CFD simulation model 205 any point that resides completely inside the design model is not in the flow field and therefore has no field data 206 associated with it.

Figure 8:
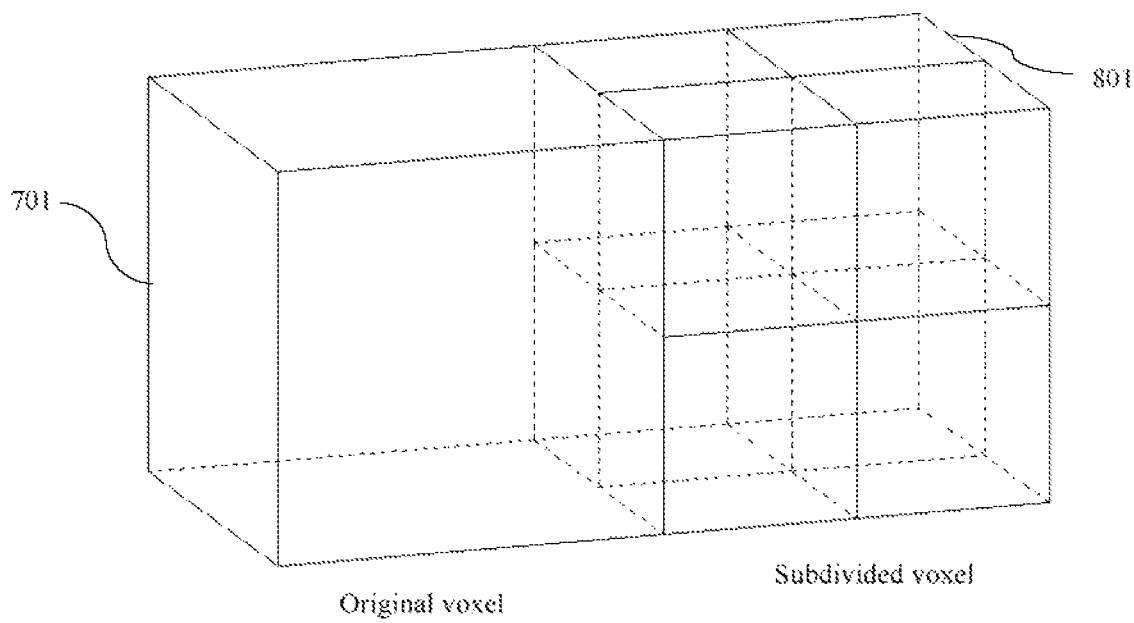
FIG. 8 is an image of a voxel from the structured grid and a subdivided voxel.

Step 404 of FIG. 4 is a method that determines if a voxel intersects the design model surface mesh 302. One method that may be used to determine the intersecting voxels 405 would be a bounding volume hierarchy search. After the intersecting voxels 405 are identified, a decision 406 is made based on a parameter possibly set by the user, to subdivide the intersecting voxels 405 or not. Subdivision is performed in order to achieve higher accuracy in data interpolation near the design model surface mesh 302. Method 407 subdivides an intersection voxel 405 into eight new voxels. An original voxel and subdivided voxel are displayed in FIG. 8. These new sub-voxels are classified by method 404 to determine which of them are intersecting voxels 405. Once the subdivision process is complete and the entire set of intersecting voxels 405 have been found, system 408 calculates the intersection points for each edge of each intersection voxel 405. These intersection points may be calculated using an algorithm such as the Möller-Trurnbore ray-triangle intersection algorithm.

In method 409 polygonal surfaces are constructed in each of the intersecting voxels 405 that correspond to the geometric intersection of the intersecting voxels 405 and the design model surface mesh 302. These polygonal surfaces may be an exact representation of the intersection of the voxels with the design model surface mesh 302 or they may be an approximation. Using algorithms such as Marching Cubes or Dual Contouring to create isosurfaces, good approximations to the surface mesh 302 may be quickly and efficiently created.

Figure 9:
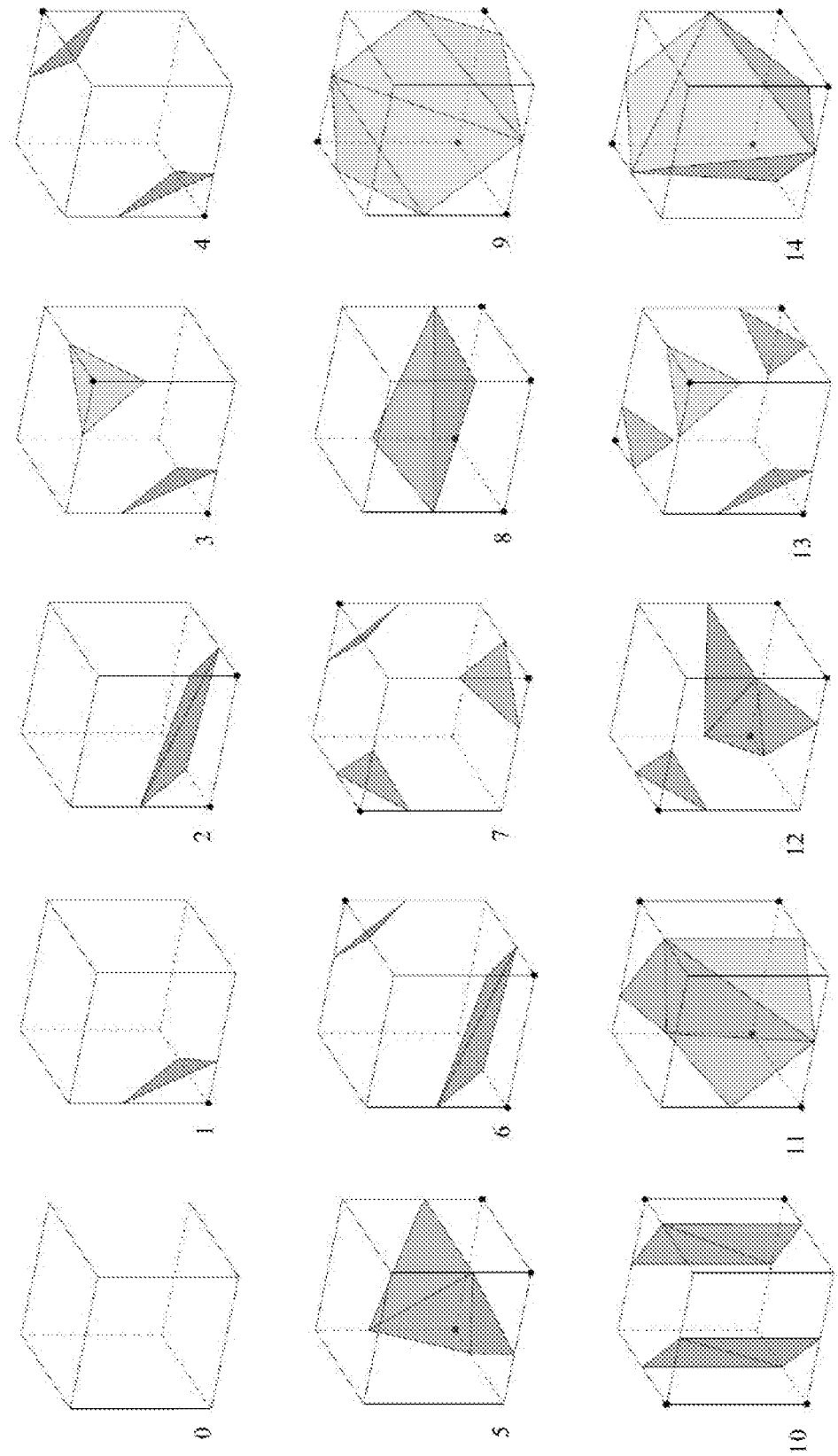
FIG. 9 is a chart depicting the standard cases for the Marching Cubes Algorithm.
Figure 10:
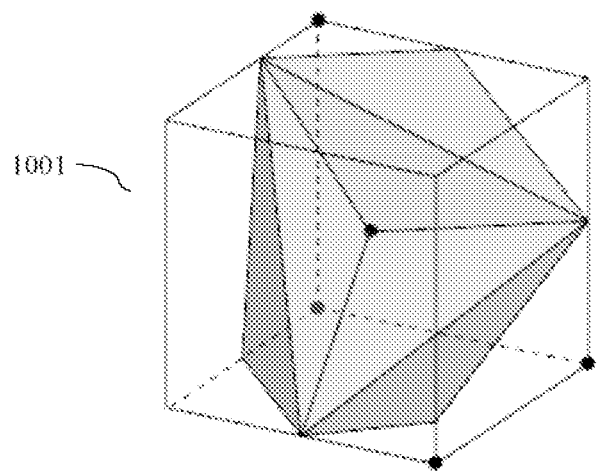
FIG. 10 displays the modification of a Marching Cubes case when the design model's surface mesh vertices are also used.

As one possible approach, method 409 determines the corresponding Marching Cubes case for each intersecting voxel 405. This determination is based on the voxel edge intersection points and the classification of the voxel's points. The standard Marching Cubes cases are displayed in FIG. 9. Once an intersecting voxel's 405 Marching Cubes case is determined, method 409 creates the polygonal mesh representing the voxel, surface mesh 302 intersection. One possible adaptation of the Marching Cubes Algorithm would be to embed the vertices from the surface mesh 302 in the intersecting voxels 405 and utilizing them in the polygonal mesh creation as displayed in FIG. 10.

Method 410 meshes the volumes of the intersecting voxel 405 that contain field data 206 conforming to the 2D polygonal mesh. This mesh may be composed of hexahedron, tetrahedron, pyramid, wedge, or polyhedral elements. The Marching Cubes cases provide stencils for the meshing the intersecting voxels 405. For example, Marching Cubes cases are used as stencils for tetrahedron meshing in the Isosurface Stuffing Algorithm. The intersecting voxels 405 now contain an unstructured mesh which combined with the standard voxels of the structured grid 403, produce a QOG 411.

Figure 5:
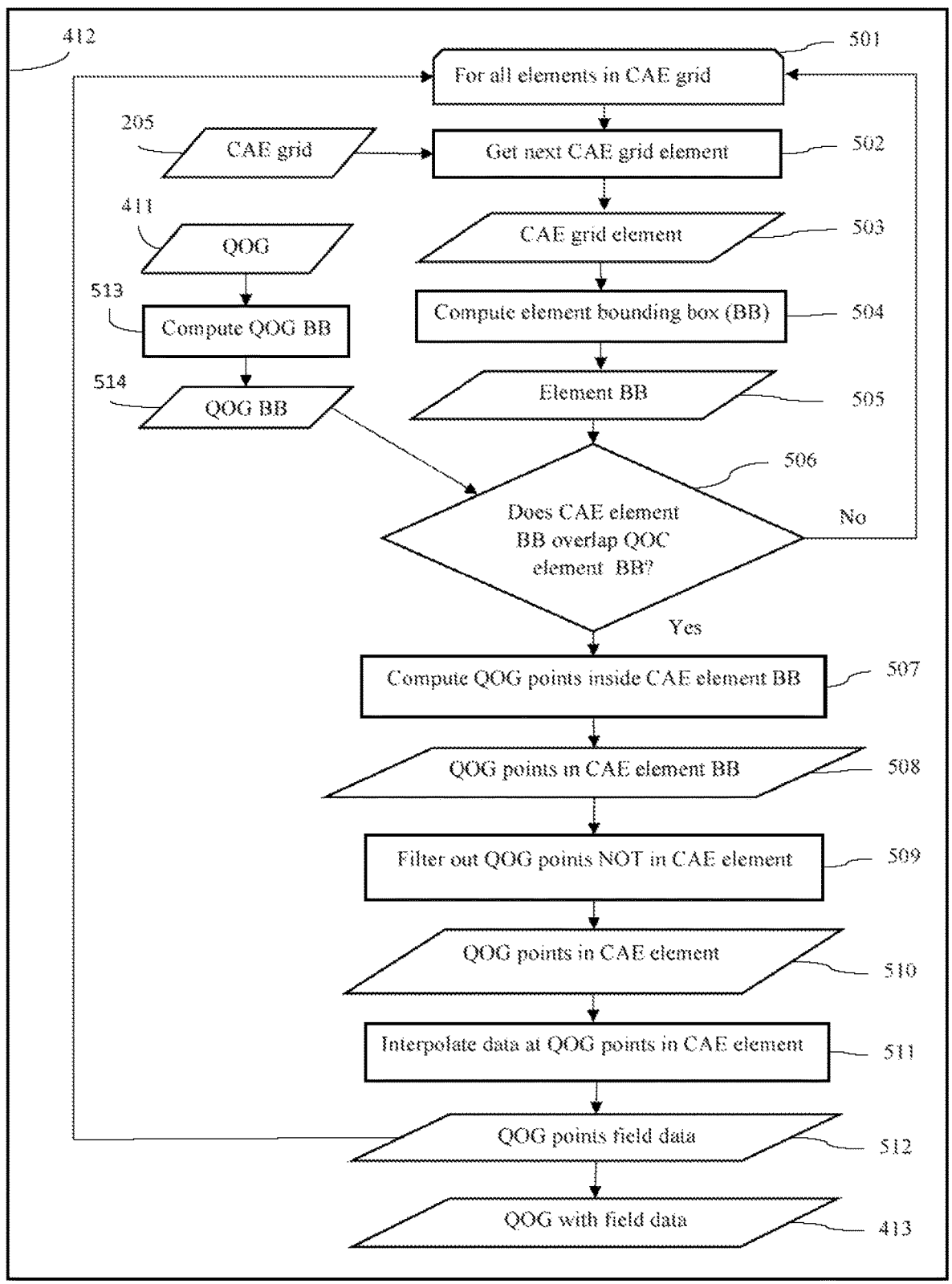
FIG. 5 is a flowchart that illustrates an optimized method for interpolating the data from the CAE model at the points of the query optimized grid.

Method 412, which is described in detail in FIG. 5, depicts a general method for utilizing a QOG. In particular, Method 412 samples the field data 206 of interest such as velocity, pressure, temperature, stress, strain, or other data for each point of the QOG 411. This sampled data is stored in a QOG 413. The field data 206 is stored in the two parts of the QOG 413. Most of the field data 206 is stored in the structured grid 403 portion of the QOG 413 corresponding to the i, j, k point locations. The structured grid portion of the QOG 413 provides for efficient and rapid querying of the data as compared to an unstructured grid. The unstructured mesh created by the intersecting voxels 405 that are part of the QOG 413 may also be queried efficiently because it resides within voxels. This eliminates extensive point classification when determining which element a point resides in. If a point is determined to exist in an intersecting voxel 405, only a few elements need to be checked in the point classification process. Accordingly, the QOG 413 may be used to store field data 206 that will be not be displayed directly on the surface of the design model.

FIG. 5 is a flowchart for method 412 describing how the sample field data 206 is obtained for each point of the QOG 413. A loop 501 is implemented which begins with step 502 that retrieves an element 503 from the CAE model grid 205. Step 504 computes the element bounding box 505 of the retrieved element 503 from the CAE model grid 205. A bounding box is the minimum box that contains a given geometric object with the constraint that the edges of the box are parallel to the Cartesian coordinate axes. Bounding boxes intersect if one or more of the intervals defined by their minimum and maximum values for any of coordinate axes ever overlap.

Step 506 then determines if the element bounding box 505 overlaps the QOG bounding box 514. If there is no overlap, the field data 206 from the element 503 does not have to be transferred to the QOG 411 so control is returned to the beginning of the loop at step 502. If there is an overlap, step 507 computes which of the QOG 411 points are inside the element bounding box 505. Step 509 then filters out the QOG points in the element bound box 508 that are not in the CAE grid element 503. This creates the set of QOG points that are inside the volume of the CAE grid element 510. Step 511 then interpolates the field data 206 attached to the CAE grid element 503 to output the QOG points with field data 512. This interpolation may be performed using the isoparametric shape functions for the element 503.

The QOG 413 may be stored in either CPU or GPU computer memory or it may be saved in data files in electronic storage 109. The data files may use relocatable data blocks. Data files written using relocatable data blocks are essentially created by taking a snapshot of the computer data memory region and saving it to computer storage 109.

Figure 11:
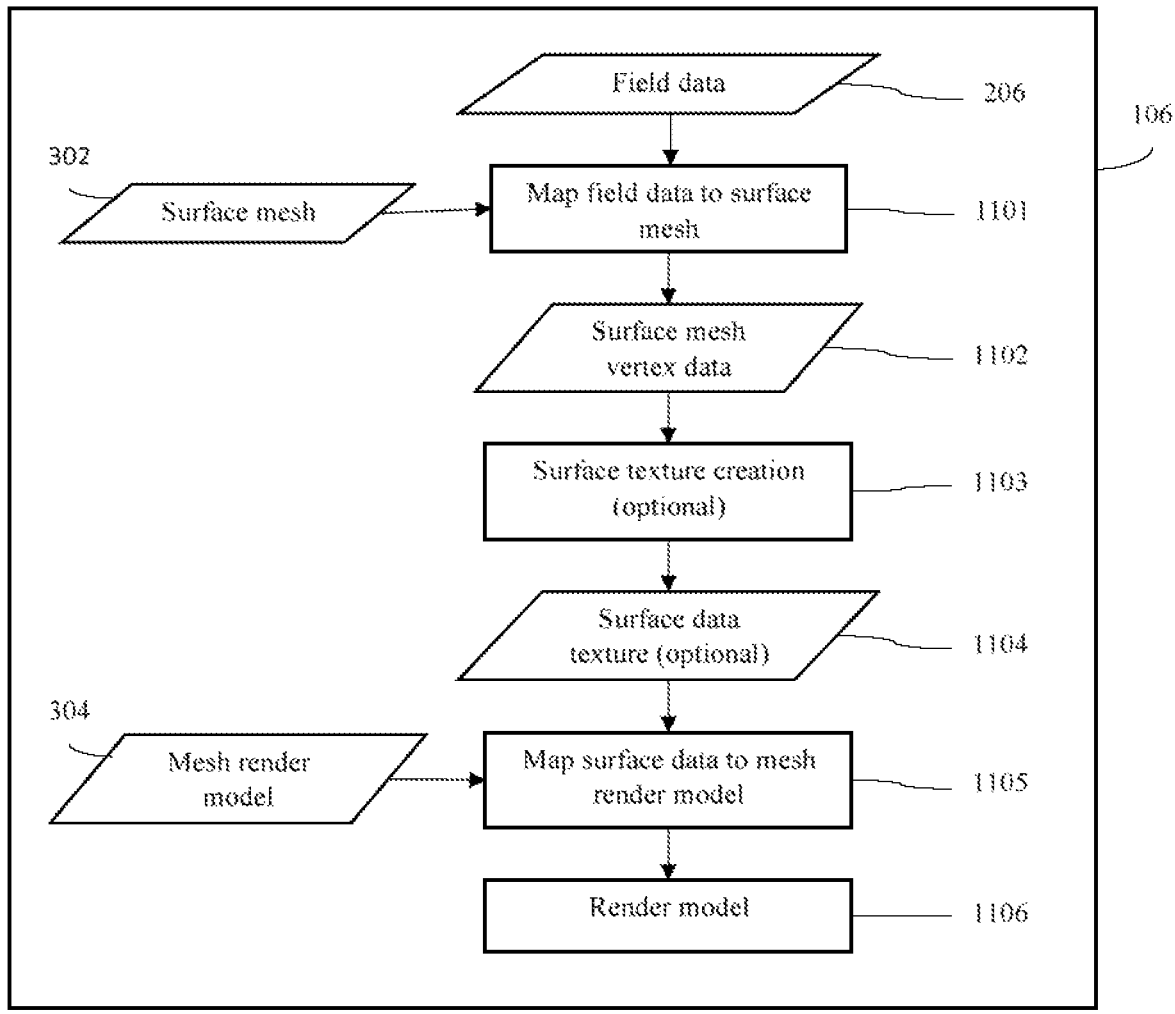
FIG. 11 is a flowchart that illustrates one example method of the data translator component which maps scalar field data onto the VR render model.

FIG. 11 illustrates another system of the data translator component 106. Often scalar values such are pressure, temperature, stress, strain, etc. are displayed on the surfaces of the CAE simulation model 205 that correspond to the design model. Vector data may also be displayed on the surfaces of the CAE simulation model 205 using techniques such as line integral convolution (LIC) vector field visualization. This field data 206 is associated with each surface point in the CAE simulation model 205. Step 1101 maps the field data 206 scalar and/or vector values to be displayed to each point on the surface mesh 302 by sampling the field data 206. A color may be assigned to each field data 206 value which is then assigned to each point of the surface mesh 302.

However, in the optional decimation process 303 that may be used to create the mesh render model 304, a significant number of surface points are eliminated along with their associated field data 206. Other surface points are also moved, making their associated field data 206 inaccurate. This method eliminates that problem by creating a surface texture map from the original surface field data 206 which can be applied to the decimated render model 304. Step 1103 creates a two-dimensional texture 1104 for the display of the field data 206 colors. Step 1105 applies the texture 1104 to the mesh render model 304 to create the render model 1106. Multiple surface textures 1104 may be created to quickly change the field data 206 displayed on the render model 1106. If decimation is not performed, step 1105 performs a direct mapping from the surface mesh vertex data 1102 to each vertex of the mesh render model 304.

Figure 12:
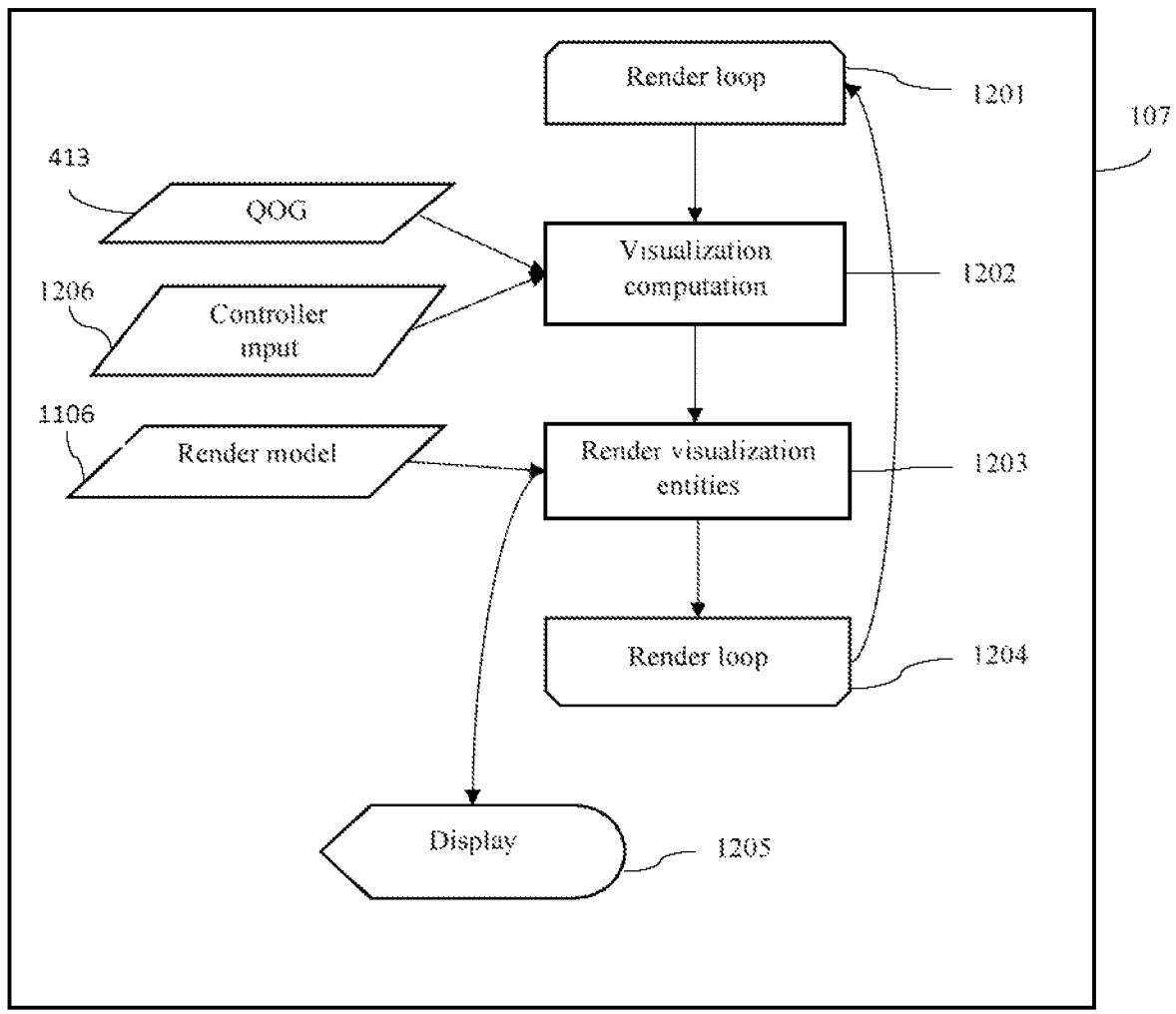
FIG. 12 is a flowchart that illustrates an example of the visualization component implementation enabling real-time data visualization.

FIG. 12 illustrates the visualization component 107 that provides the VR experience for the users. This component provides the real-time computation and display of the scalar and/or vector data by means of various visualization entities. Input to the visualization component 107 to direct where and what visualization entities should be created, is given by the controller input 1206. For example, if the user decides to create a streamline from the velocity field data for a CFD simulation model 205, the users selects a point in space inside the QOG 413. That information is sent from the controller input 1206 to the visualization computation method 1202 which creates the visualization entities like streamlines.

Step 1203 uses the point data generated by the computation step 1202 to create the visualization entities. As an example, a streamline entity may be created by a piecewise linear line of the points data or a spline interpolating the point data. The streamline may then be colored using the scalar data associated with the streamline points. Particles may also be created which have their position updated by integration of the velocity field data of the QOG 413. For example, these particles may be used to create a virtual smoke wand to determine actual particle flow in the velocity field. This method may also change the scalar color values or surface texture displayed on the surface of the render model 1106.

The methods and systems of the visualization component 107 are performed in real-time during the VR experience. The environment displayed is continuously rendered at typically 80 to 90 frames per second to achieve a realistic, immersive experience. The continuous render loop is illustrated in steps 1201 and 1204. The rendered information is displayed in step 1205. The VR experience may be displayed on a variety of devices including client devices 102.

Figure 13:
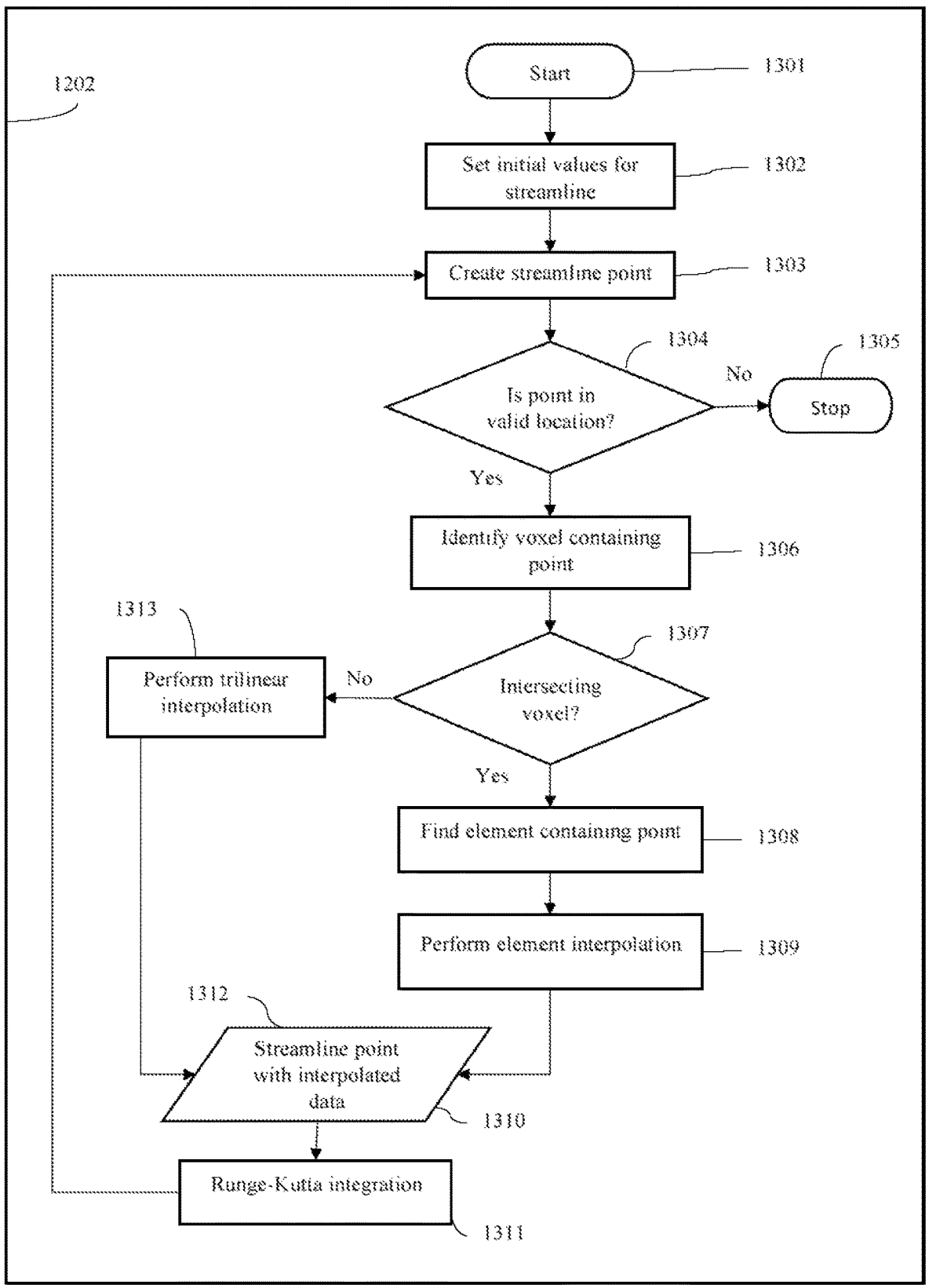
FIG. 13 is a flowchart that illustrates one example of a method to create a streamline.

As one possible example of the visualization entity computation 1202, FIG. 13 describes how a streamline is calculated. A streamline is a line that is everywhere tangent to the vector field. It indicates the path a massless particle would travel through the velocity field if released at the starting point of the streamline. Method 1302 sets the initial values for the creation of the streamline which includes the location for the start of the streamline. Step 1303 creates the first point in the streamline. Then method 1304 checks to see if the point resides in the domain of the QOG 413. If it does not, there is no valid field data 206 associated with that point and method 1304 terminates the creation of the streamline. If the streamline point does reside inside the QOG 413, method 1306 determines if the point resides in a standard voxel 601, a subdivided voxel 701, or an intersecting voxel 405.

Figures 14, 15:
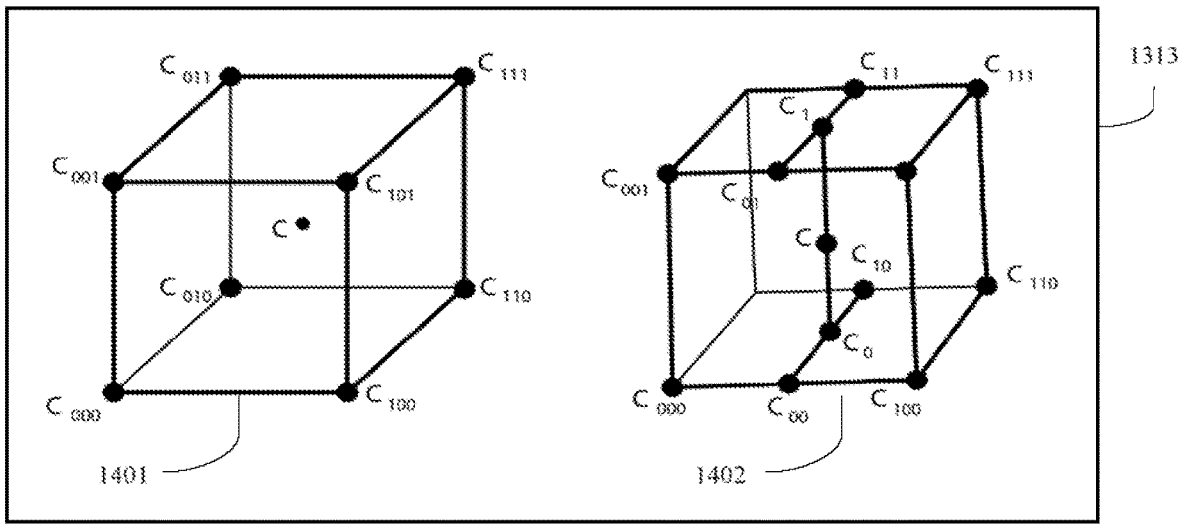
FIG. 14 illustrates the trilinear interpolation of field data in the voxel of a query optimized grid.
FIG. 15 illustrates the Runge-Kutta fourth-order integration formula.

If the point is found inside a standard voxel 601 or a subdivided voxel 701 as depicted in 1401 of FIG. 14, a trilinear interpolation 1313 is performed to determine the field data 206 values for that point 1312. The trilinear interpolation steps 1302 are also shown in FIG. 14. The structure of a standard voxel 601 or a subdivided voxel 701, enables the use of the computationally efficient trilinear interpolation 1402. If the point is found inside an intersecting voxel 405, a determination 1308 is made to specify which three dimensional element of the meshed volume of the intersecting voxel 405 contains the point. Once the element is found, standard isoparametric interpolation 1309 is performed for the specified element's type to determine the field data 206 values for the point 1312.

One possible method of calculating the next streamline point is the Runge-Kutta integration method 1311. The fourth-order formula is illustrated in FIG. 15. Scalar values may also be calculated at each point in the streamline and may be used to color the streamline. An example would be to calculate the velocity magnitude and to use it to color the line to indicate the speed of a particle as it moves along the streamline.

The data structure imposed in the QOG 413 enables rapid numeric calculation because at each step of the integration, the voxel 601 which the point resides in, is easily determined because each voxel 601 is also an axis aligned bounding box.

Figure 16:
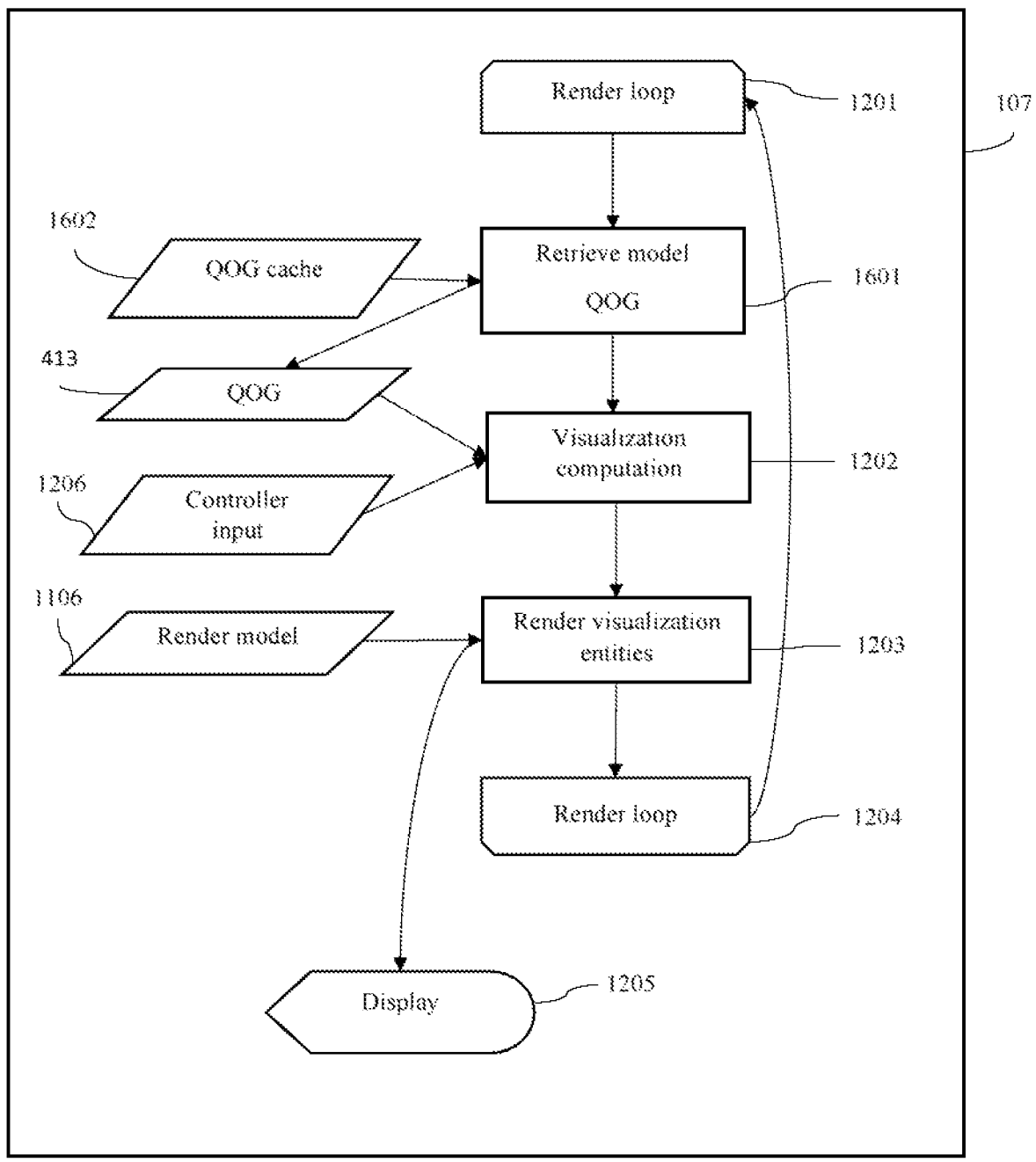
FIG. 16 is a flowchart that illustrates one example of the visualization component implementation enabling real-time transient data visualization.

FIG. 16 illustrates an embodiment of the visualization component 107 that provides a method for users to visualize transient field data 206. Transient simulation is used when the field data 206 changes with respect to time. Simulations are performed at specified time steps for a predetermined period of time in order to capture the time variant behavior of the field data 206. Typically, the results of these multiple analysis are used to create animations to visualize the varying field data 206. This system is a modification of the system illustrated in FIG. 12 by the addition of a QOG cache 1602 which contains the QOGs 413 that are created for the field data 206 at each time step. Method 1601 retrieves the QOGs 413 from the query optimized grid cache 1602 as the user selected visualization entities may be continuously created in step 1203 and displayed 1205 to visualize the transient field data 206 in real-time.

Figure 17:
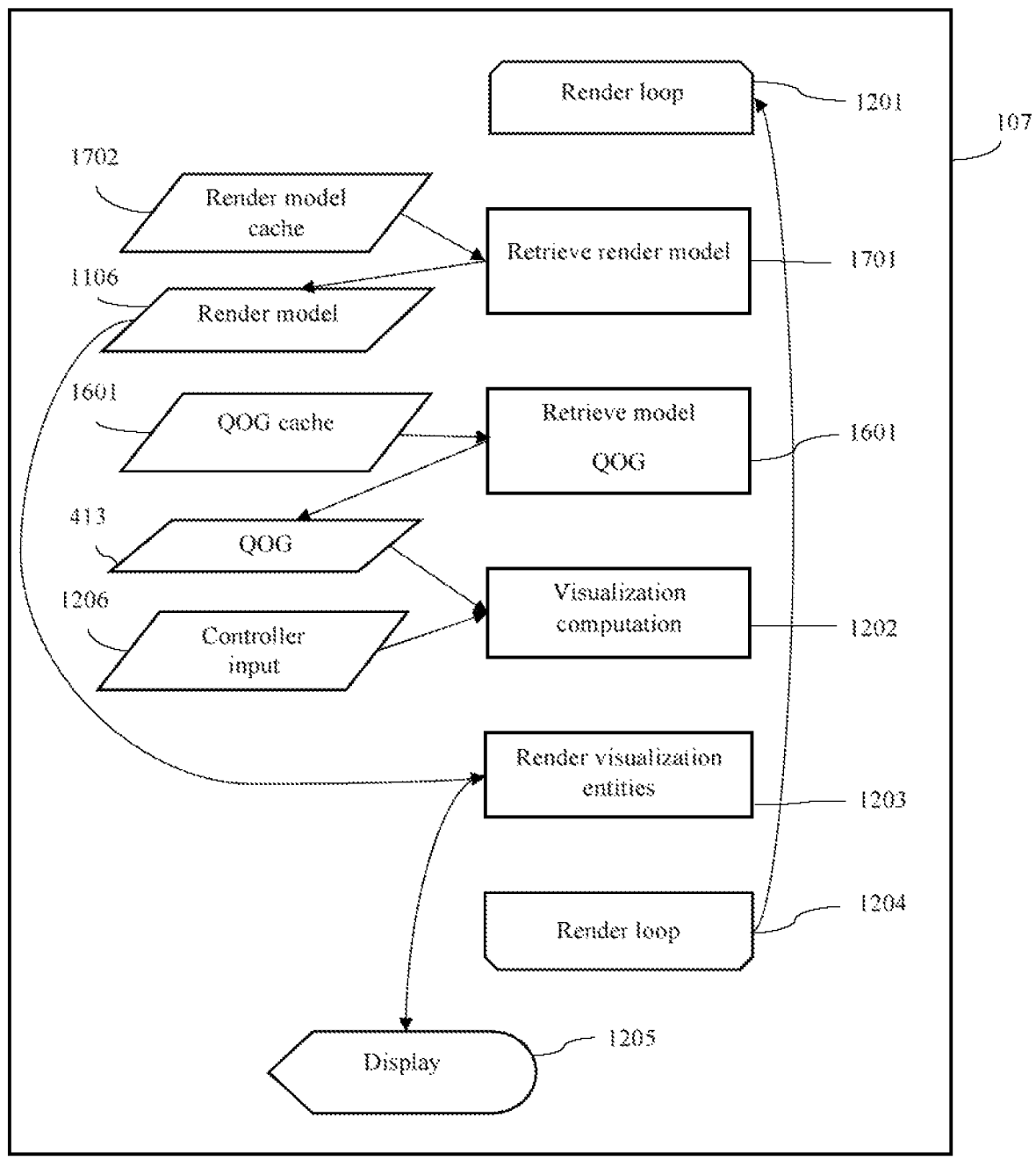
FIG. 17 is a flowchart that illustrates one example of the visualization component implementation enabling real-time data visualization for a baseline CAE model and modified CAE models simultaneously.

FIG. 17 illustrates an embodiment of the visualization component 107 that provides for users to visualize a baseline CAE model and a design variation CAE model. This system is a modification of the system illustrated in FIG. 12 by the addition of a QOG cache 1602 and a render model cache 1702 which contain the QOG 413 and render models 1106 for the baseline design and modified designs respectively. Method 1701 retrieves the render models 1106 to be displayed from the render model cache 1702 which are in computer memory. Method 1601 retrieves the QOGs 413 from the QOG cache 1602 which correspond to the retrieved render models 1106. Step 1203 then creates the visualization entities for the baseline model and the design variation model which may then be display simultaneously.

The VR experience provided by the VR application 100 will permit users to traverse the virtual environment, translate and rotate the CAE simulation model 205 and fully control the field data 206 visualization. The users may interact with the CAE simulation model 205 by using virtual provided tools to direct what type and where visualization entities are created. Hand controllers may be provided that users can use to manipulate objects, teleport in the virtual environment, and control the user interface component 108. Control may be exercised by virtual graphical user interface menus with buttons, sliders, checkboxes, and other standard user interface widgets manipulated by the controllers. Users may interact with each other in the environment, by exchanging communications either verbally or other communications.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing an immersive VR experience, the method executed on a computer processor from instructions stored in computer memory, the method comprising:
   defining in the computer memory, a model representing a three-dimensional model;
   producing field data based upon a simulation of the three-dimensional model, wherein the field data comprises data relating to one or more of temperature, density, velocity, pressure, stress, strain, magnetic fields, electric fields, field direction, current flow, or vector potential;
   storing the field data within a data structure;
   extracting, for display, a surface of the three-dimensional model from a simulation model;
   creating a surface texture for the surface of the three-dimensional model from the field data;
   creating a query optimized grid from the field data; and
   displaying a visualization of the field data by means of the surface and the query optimized grid.

2. The method of claim 1, wherein surface elements of the simulation model corresponding to the three-dimensional model are extracted from the simulation model.

3. The method of claim 2, wherein a surface texture is created from the surface elements.

4. The method of claim 3, wherein scalar and/or vector values of the field data are mapped to the surface texture.

5. The method of claim 1, wherein a structured grid is created for a domain of the simulation model or a subset of the simulation model.

6. The method of claim 5, wherein a size and number of points in the structured grid are defined by a user.

7. The method of claim 5, wherein the field data is sampled at points corresponding to point locations of the structured grid.

8. The method of claim 7, wherein visualization data is used to construct visualization entities which include at least one of: streamlines, particle flows, isosurfaces, contours, slices, and glyphs.

9. The method of claim 5, wherein an unstructured grid is created for a mesh of the surface of the domain of the simulation model or the subset of the simulation model.

10. A computer system for providing a VR experience, the computer system comprising;
a processor; and
a memory with computer code instructions stored thereon, the processor and the memory, with the computer code instructions be configured to cause the computer system to:
define in the memory, a model representing a three-dimensional model;
produce field data based upon a simulation of the three-dimensional model, wherein the field data comprises data relating to one or more of temperature, density, velocity, pressure, stress, strain, magnetic fields, electric fields, field direction, current flow, or vector potential;
store the field data within a data structure;
extract, for display, a surface of the three-dimensional model from a simulation model;
create a surface texture for the surface of the three-dimensional model from the field data;
create a query optimized grid from the field data; and
display a visualization of the field data by means of the surface and the query optimized grid.

11. The computer system of claim 10, wherein the VR experience is provided to users via a VR headset.

12. The computer system of claim 10, wherein the VR experience is provided to users via an augmented reality headset.

13. The computer system of claim 10, wherein a structured grid is created for a domain of the simulation model or a subset of the simulation model.

14. The computer system of claim 13, wherein an unstructured grid is created for a mesh of the surface of the domain of the simulation model or the subset of the simulation model.

* * * * *